W. W. PAGE.
PRUNING SAW.
APPLICATION FILED APR. 29, 1914.
1,174,893.
Patented Mar. 7, 1916.
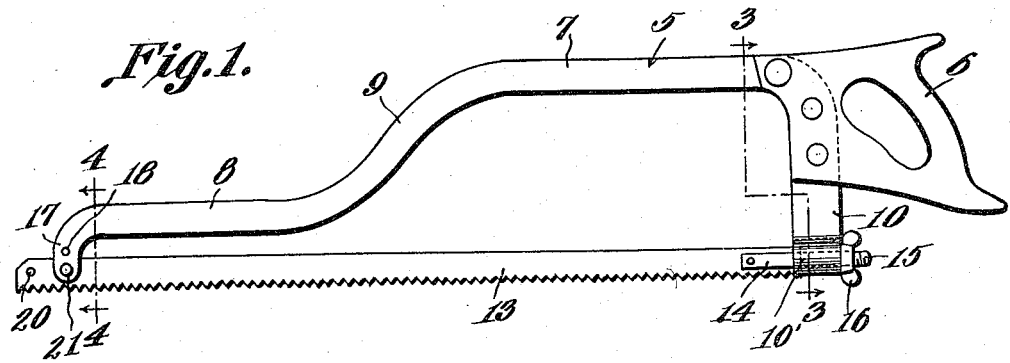
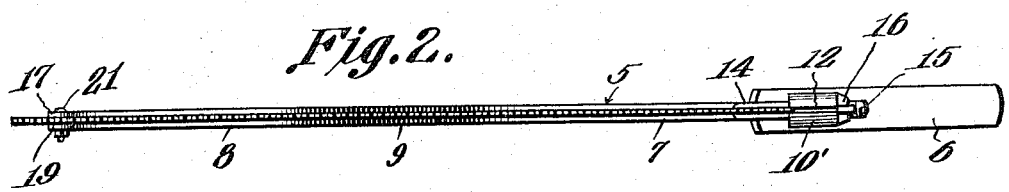
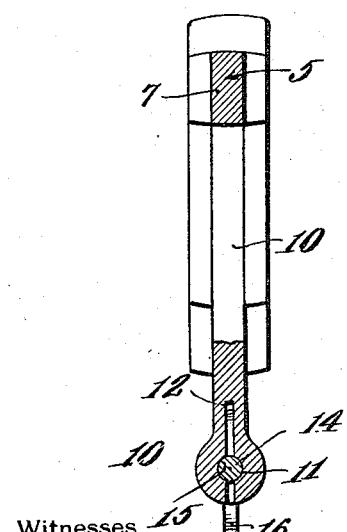
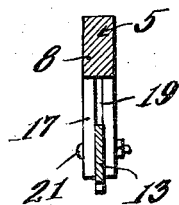
William W. Page,
Inventor
Witnesses
by C. A. Snow & Co.
Attorneys
THE COLUMBIA PLANOGRAPH CO., WASHINGTON, D. C.

UNITED STATES PATENT OFFICE.

WILLIAM W. PAGE, OF CENTERVILLE, TENNESSEE.

PRUNING-SAW.

1,174,893.  Specification of Letters Patent.  Patented Mar. 7, 1916.

Application filed April 29, 1914. Serial No. 835,179.

*To all whom it may concern:*

Be it known that I, WILLIAM W. PAGE, a citizen of the United States, residing at Centerville, in the county of Hickman and State of Tennessee, have invented a new and useful Pruning-Saw, of which the following is a specification.

The object of this invention is to provide a pruning saw, the frame of which is so shaped that limbs of different diameters may be cut off, the construction of the frame being such that the nose or forward end thereof may be reciprocated between closely adjacent limbs, without producing a wedging of the saw between such limbs.

In the accompanying drawings: Figure 1 is a view in side elevation of my improved pruning saw. Fig. 2 is a bottom plan view thereof. Fig. 3 is a sectional view taken on the line 3—3 of Fig. 1. Fig. 4 is a sectional view taken on the line 4—4 of Fig. 1.

The invention comprises a frame 5, to the rear portion of which is rigidly secured a handle 6. The frame includes a rear extremity 7 and a front extremity 8 which are connected by an offset and curved portion 9. The rear extremity 7 is provided with a rear arm 10 which is enlarged as at $10^1$ and through which enlarged portion extends a bore 11. A slot 12 extends longitudinally of the portion $10^1$, intersecting the bore 11 and extending thereabove as illustrated in Fig. 3. The saw blade 13 is provided at its rear extremity with a draw rod 14 slidable in the bore 11. The rear extremity of the draw rod is threaded as at 15 to receive a wing nut 16, adapted to produce tension in the saw blade.

The portion 8 of the frame terminates in a front arm 17 through which a number of transverse apertures 18 extend. The front arm 17 is provided with a longitudinal slot 19 adapted to receive the saw blade 13. The front extremity of the saw blade is provided with a number of apertures 20 one of which is adapted to aline with the apertures 18 of the arm and thus receive a holding bolt 21.

It is to be observed that the part 8 of the saw frame defines with the blade 13, a reduced nose of substantial length. Further, the upper end of the part 8 is parallel to the lower edge of the blade 13. Consequently, the nose above alluded to may be reciprocated between tree limbs which are close together, without wedging the saw between such limbs. There is a distinct advantage, further, in spacing the part 7 of the saw frame from the blade 13 more widely than the part 8. Because the part 7 of the saw frame is spaced at a considerable distance from the blade 13, larger limbs can be sawed off by the rear portion of the blade than can be sawed off by the front portion of the blade.

Having thus fully described my invention, what I claim is:—

A pruning saw embodying an arched frame and a blade assembled with the ends of the frame, the top of the frame comprising front and rear parallel portions, the rear portion being provided with a handle, and the front portion lying closer to the blade than the rear portion and being parallel to the cutting edge of the blade to define a reduced nose of substantial length, which may be reciprocated between the tree limbs without wedging, the space above the front portion of the frame being open and unencumbered.

In testimony that I claim the foregoing as my own, I have hereto affixed my signature in the presence of two witnesses.

WILLIAM W. PAGE.

Witnesses:
A. F. PEARSON,
W. C. WARREN.

Copies of this patent may be obtained for five cents each, by addressing the "Commissioner of Patents, Washington, D. C."